(12) United States Patent
Cheung et al.

(10) Patent No.: US 9,561,491 B2
(45) Date of Patent: Feb. 7, 2017

(54) CERIUM OXIDE HAVING HIGH CATALYTIC PERFORMANCE

(75) Inventors: Chin Li Cheung, Lincoln, NE (US);
Neil J. Lawrence, Lincoln, NE (US);
Joseph R. Brewer, Beatrice, NE (US);
Gonghua Wang, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 215 days.

(21) Appl. No.: 13/639,778

(22) PCT Filed: Apr. 6, 2011

(86) PCT No.: PCT/US2011/031467
§ 371 (c)(1),
(2), (4) Date: Jan. 29, 2013

(87) PCT Pub. No.: WO2011/127208
PCT Pub. Date: Oct. 13, 2011

(65) Prior Publication Data
US 2013/0123100 A1 May 16, 2013

Related U.S. Application Data

(60) Provisional application No. 61/321,362, filed on Apr. 6, 2010.

(51) Int. Cl.
*B01J 23/10* (2006.01)
*B01J 23/63* (2006.01)
(Continued)

(52) U.S. Cl.
CPC ............... *B01J 23/10* (2013.01); *B01J 23/63* (2013.01); *B01J 23/66* (2013.01); *B01J 23/83* (2013.01); *B01J 35/0013* (2013.01); *B01J 37/009* (2013.01); *B01J 37/033* (2013.01); *B01J 37/038* (2013.01); *B01J 37/08* (2013.01);
(Continued)

(58) Field of Classification Search
CPC ........................... B01J 23/10; B01J 2525/3712
See application file for complete search history.

(56) References Cited

U.S. PATENT DOCUMENTS

| 4,908,108 A | 3/1990 | Horbez et al. ................ 204/93 |
| 7,504,356 B1 | 3/2009 | Self et al. ..................... 502/304 |

(Continued)

OTHER PUBLICATIONS

Abad et al ("Catalyst Parameters Determining Activity and Selectivity of Supported Gold Nanoparticles for the Aerobic Oxidation of Alcohols: The Molecular Reaction Mechanism," Chemistry: A European Journal 14(1), pp. 212-222, Dec. 2007).*

(Continued)

*Primary Examiner* — Melvin C Mayes
*Assistant Examiner* — James Corno
(74) *Attorney, Agent, or Firm* — Fish & Richardson P.C.

(57) ABSTRACT

A catalyst that includes cerium oxide having a fluorite lattice structure is provided. The cerium oxide includes cerium atoms in mixed valence states of $Ce^{3+}/Ce^{4+}$, in which the ratio of $Ce^{3+}/(Ce^{3+}+Ce^{4+})$ in the lattice ranges from 40% to 90% at 20° C. The valence states $Ce^{3+}$ and $Ce^{4+}$ are reversible in reduction and oxidation reactions, and the cerium oxide maintains catalytic ability at temperatures at least up to 450° C.

37 Claims, 12 Drawing Sheets

(51) Int. Cl.

| | |
|---|---|
| B01J 23/66 | (2006.01) |
| B01J 23/83 | (2006.01) |
| B01J 35/00 | (2006.01) |
| B01J 37/00 | (2006.01) |
| B01J 37/03 | (2006.01) |
| B01J 37/08 | (2006.01) |
| B82Y 30/00 | (2011.01) |
| C01F 17/00 | (2006.01) |

(52) U.S. Cl.
CPC .......... *B82Y 30/00* (2013.01); *C01F 17/0043* (2013.01); *B01J 2523/3712* (2013.01); *C01P 2002/04* (2013.01); *C01P 2002/30* (2013.01); *C01P 2002/72* (2013.01); *C01P 2002/85* (2013.01); *C01P 2004/13* (2013.01); *C01P 2004/16* (2013.01); *C01P 2004/38* (2013.01); *C01P 2004/64* (2013.01)

(56) References Cited

U.S. PATENT DOCUMENTS

| | | | |
|---|---|---|---|
| 2003/0166987 A1 | 9/2003 | Roark | 588/205 |
| 2006/0254605 A1* | 11/2006 | El-Shall et al. | 131/331 |

OTHER PUBLICATIONS

Wang et al. ("The preparation of Au/CeO2 catalysts and their activities for low-temperature CO oxidation," Catalysis Letters 112(1-2), pp. 115-119, Nov. 2006).*
Tang et al. ("The role of Sn in Pt—Sn/CeO2 catalysts for the complete oxidation of ethanol," Journal of Molecular Catalysis A: Chemical 235(1-2), pp. 122-129, Jul. 2005).*
Serrano-Ruiz et al. ("Pt—Sn catalysts supported on highly-dispersed ceria on carbon: Application to citral hydrogenation," Journal of Molecular Catalysis A: Chemical 268(1-2), pp. 227-234, May 2007).*
Han et al. ("One-Dimensional Ceria as Catalyst for the Low-Temperature Water-Gas Shift Reaction," J. Phys. Chem. C 113(2), pp. 21949-21955, Dec. 2009; hereinafter referred to as "Han JPC").*
Widmann et al. ("Activation of a Au/CeO2 catalyst for the CO oxidation reaction by surface oxygen removal/oxygen vacancy formation," J. Catal. 251, pp. 437-442, Sep. 2007).*
Jian et al ("Theoretical study of environmental dependence of oxygen vacancy formation in CeO2," Applied Physics Letters 87 141917, Sep. 2005).*
Skoda et al., "Sn interaction with the CeO2(1 1 1) system: Bimetallic bonding and ceria reduction," Applied Surface Science 254(14), pp. 4375-4379, May 2008.*
Tana et al., "Morphology-dependent redox and catalytic properties of CeO2 nanostructures: Nanowires, nanorods and nanoparticles," Catalysis Today 148(1-2), pp. 179-183, Mar. 2009.*
Karpenko et al., "Influence of the catalyst surface area on the activity and stability of Au/CeO2 catalysts for the low-temperature water gas shift reaction," Topics in Catalysis 44(1-2), pp. 183-198, Jun. 2007.*
Bevan et al., "Mixed oxides of the type MO2 (fluorite)-M2O3—I: Oxygen Dissociation Pressures and Phase Relationships in the System CeO2—Ce2O3 at High Temperatures," Journal of Inorganic and Nuclear Chemistry 26(9), Sep. 1964.*
Babu et al., "Dopant-mediated oxygen vacancy tuning in ceria nanoparticles," *Nanotech.*, Feb. 2009, 20(8), 5 pages.
Boudart, "Turnover Rates in Heterogeneous Catalysis," *Chem Rev.*, 1995, 95(3):661-666.
Campbell and Peden, "Chemistry—Oxygen vacancies and catalysis on ceria surfaces," *Sci.*, Jul. 2005, 309(5735):713-4.
Chen et al., "Formation of $CeO_2$ Nanotubes from $Ce(OH)CO_3$ Nanorods through Kirkendall Diffusion," *Inorganic Chemistry*, 2009, 48(4):1334-1338.
Chen et al., "Template-free Synthesis of Single-Crystalline-like $CeO_2$ Hollow Nanocubes," *Crystal Growth & Design*, Dec. 2008, 8(12):4449-53.
Esch et al., "Electron localization determines defect formation on ceria substrates," *Sci.*, Jul. 2005, 309(5735):752-755.
Gonzalez-Rovira et al., "Single-Step Process to Prepare $CeO_2$ Nanotubes with Improved Catalytic Activity," *Nano Lett.*, 2009, 9(4):1395-400.
Grabow et al., "Lattice strain effects on CO oxidation on Pt(111)," *PCCP*, 2006, 8(29):3369-74.
Greeley et al., "Strain-Induced Formation of Subsurface Species in Transition Metals," *Angew Chem Int Ed.*, 2004, 43(33):4296-300.
Holgado et al., "Study of $CeO_2$ XPS spectra by factor analysis: reduction of $CeO_2$," *Appl Surf Sci.*, 2000, 161(3-4):301-15.
Luo et al., "High-surface area CuO—$CeO_2$ catalysts prepared by a surfactant-templated method for low-temperature CO oxidation," *J Catal.*, 2007, 246(1):52-9.
Mavrikakis et al., "Effect of Strain on the Reactivity of Metal Surfaces," *Phys Rev Lett.*, 1998, 81(13):2819-2822.
Nilius, "Properties of oxide thin films and their adsorption behavior studied by scanning tunneling microscopy and conductance spectroscopy," *Surf Sci Rep.*, Dec. 2009, 64(12):595-659.
Nolan et al., "Oxygen vacancy formation and migration in ceria," *Solid State Ionics*, Nov. 2006, 177(35-36):3069-3074.
Pan et al., "Template-Free Synthesis, Controlled Conversion, and CO Oxidation Properties of $CeO_2$ Nanorods, Nanotubes, Nanowires, and Nanocubes," *Eur J Inorg Chem.*, 2008, 2008(15):2429-2436.
Pirmohamed et al., "Nanoceria exhibit redox state-dependent catalase mimetic activity," *Chem Commun.*, 2010, 46(16):2736-8.
Shan et al., "The Synthesis of Three-Dimensional $CeO_2$ and Their Catalytic Activities for CO Oxidation," *Catal Lett.*, 2009, 131(3):350-5.
Sun and Chen, "Controllable Synthesis of Shuttle-Shaped Ceria and Its Catalytic Properties for CO Oxidation," *Eur J Inorg Chem.*, 2009, 26:3883-7.
Zhang et al., "Oxygen vacancy clusters on ceria: Decisive role of cerium electrons," *Phys Rev B.*, Feb. 2009, 79(7), 11 pages.
Zhang et al., "Fabrication of novel threefold shape $CeO_2$ dendrites: Optical and electrochemical properties," *Chem Phy Lett.*, 2006, 430(4-6)326-329.
Zhong et al., "3D Flowerlike Ceria Micro/Nanocomposite Structure and Its Application for Water Treatment and CO Removal," *Chem Mater.*, 2007, 19(7):1648-55.
Zhou, "Metal-oxide interfaces at the nanoscale," *Appl Phys Lett.*, Jun. 2009, 94(233115):1-3.
Zhou et al., "Highly Reducible $CeO_2$ Nanotubes," *Chem Mater.*, 2007, 19(6):1215-1217.
International Search Report, International Application PCT/US2011/031467, 4 pages, Jan. 2, 2012.

* cited by examiner

US 9,561,491 B2

CERIUM OXIDE HAVING HIGH CATALYTIC PERFORMANCE

CROSS-REFERENCE TO RELATED APPLICATION

This application is a National Stage Application under 35 U.S.C. §371 and claims the benefit of International Application PCT/US2011/031467, filed on Apr. 6, 2011, which claims priority to U.S. Application 61/321,362, filed on Apr. 6, 2010. The above applications are herein incorporated by reference in their entirety.

TECHNICAL FIELD

This subject matter is generally related to cerium oxide having high catalytic performance.

BACKGROUND

Catalysts can be used to change the rates and control the yields of chemical reactions to increase the amounts of desirable products from these reactions and reduce the amounts of undesirable ones. For example, cerium(IV) oxide ($CeO_2$) (also referred to as ceria) can be used in catalytic converters for reducing carbon monoxide emissions in exhaust gases from motor vehicles. Cerium exists in both trivalent state (+3) and tetravalent (+4) state and may switch between the two in reduction and oxidation reactions. Cerium(IV) oxide can be reduced by carbon monoxide to cerium(III) oxide:

$$2CeO_2+CO \rightarrow Ce_2O_3+CO_2,$$

and cerium(III) oxide can be oxidized to cerium(IV) oxide:

$$2Ce_2O_3+O_2 \rightarrow 4CeO_2.$$

Cerium oxide is also useful in three-way catalysis, petroleum cracking, water gas shift reaction, fuel cells, and synthetic organic chemistry. It has been proposed that the catalytic traits of cerium oxide can be attributed to two properties of ceria: (i) the high mobility and storage capacity of oxygen within the lattice, and (ii) the ease with which cerium changes between $Ce^{3+}$ and $Ce^{4+}$ states to allow the high oxygen mobility within the oxide lattice. These properties, combined with the abundance of cerium on earth, make ceria a low-cost and effective alternative to noble metal catalysts.

SUMMARY

In general, in one aspect, a catalyst that includes cerium oxide having a fluorite lattice structure is provided. The cerium oxide includes cerium atoms in mixed valence states of $Ce^{3+}$ and $Ce^{4+}$, in which the ratio of $Ce^{3+}/(Ce^{3+}+Ce^{4+})$ in the lattice ranges from 40% to 90% at 20° C. The valence states $Ce^{3+}$ and $Ce^{4+}$ are reversible in reduction and oxidation reactions, and the cerium oxide maintains catalytic ability at temperatures at least up to 450° C.

Implementations of the catalyst may include one or more of the following features. The catalyst can include small particles decorated near the surface of the fluorite structured cerium oxide lattice, in which the surface region of the cerium oxide lattice structure has a higher concentration of the small particles than an inner region of the cerium oxide lattice structure, the small particles having a diameter equal to or less than 1 nm. The small particles can include gold, tin, palladium, an alloy of gold and silver, an alloy of gold and copper, the oxide of the above, or a combination of the above. The small particles can include gold particles, and the concentration of the gold particles on the cerium oxide can range from 0.001 to 5.0 atomic percent compared to cerium. The concentration of the gold particles can range from 0.005 to 0.02 atomic percent compared to cerium. The small particles can include palladium particles or palladium oxide particles, and the concentration of the palladium particles or palladium oxide particles on the fluorite structured cerium oxide can range from 0.1 to 5 atomic percent compared to cerium. The small particles can include gold, silver, copper, zirconium, vanadium, platinum, palladium, iron, zinc, cobalt, silicon, nickel, manganese, rhodium, ruthenium, tungsten, rhenium, cadmium, iridium, molybdenum, phosphorus, tantalum, osmium, titanium, chromium, scandium, sulfur, rare earths elements, the oxide of one or more of the above, or a combination of the above. The fluorite structured cerium oxide can include cerium oxide nanoscale structures. The nanoscale structures can include nanotubes, nanocubes, nanoparticles, nanorods, nanowires, nanostars, or complex nanoshapes. In some examples, the ratio of $Ce^{3+}/(Ce^{3+}+Ce^{4+})$ in the lattice structure can range from 40% to 50% at 20° C. In some examples, the ratio of $Ce^{3+}/(Ce^{3+}+Ce^{4+})$ in the lattice structure can range from 50% to 60% at 20° C. In some examples, the ratio of $Ce^{3+}/(Ce^{3+}+Ce^{4+})$ in the lattice structure can range from 60% to 70% at 20° C. In some examples, the ratio of $Ce^{3+}/(Ce^{3+}+Ce^{4+})$ in the lattice structure can range from 70% to 90% at 20° C.

In general, in another aspect, a method of fabricating a catalyst is provided. The method includes producing fluorite structured cerium oxide having a lattice structure that includes cerium atoms in mixed valence states of $Ce^{3+}$ and $Ce^{4+}$; and activating the cerium oxide in a low pressure environment having oxygen, the pressure being in a range from $1 \times 10^{-10}$ to 10 Torr such that after activation, the ratio of $Ce^{3+}/(Ce^{3+}+Ce^{4+})$ in the cerium oxide lattice structure ranges from 40% to 90% at 20° C. The valence states $Ce^{3+}$ and $Ce^{4+}$ are reversible in reduction and oxidation reactions, and the cerium oxide maintains effective catalytic ability at temperatures at least up to 450° C.

Implementations of the method may include one or more of the following features. Activating the cerium oxide can include flowing a mixture of $O_2$ and an inert gas over the surface of the cerium oxide at a temperature between 300 to 400° C. at a pressure not more than 0.1 Torr. The fluorite structured cerium oxide can include fluorite structured cerium oxide nanostructures. The fluorite structured cerium oxide nanostructures can include fluorite structured cerium oxide nanotubes, nanocubes, nanoparticles, nanorods, nanowires, nanostars, or complex nanoshapes. The method can include controlling the pressure in the environment during activation to control the ratio of $Ce^{3+}/(Ce^{3+}+Ce^{4+})$ in the cerium oxide lattice structure. The method can include applying a lower pressure in the environment during activation to achieve a higher ratio of $Ce^{3+}/(Ce^{3+}+Ce^{4+})$ in the cerium oxide lattice structure, as compared to the ratio of $Ce^{3+}/(Ce^{3+}+Ce^{4+})$ in the cerium oxide that is produced by applying a higher pressure in the environment during activation.

In general, in another aspect, a method of fabricating a catalyst is provided. The method includes fabricating fluorite structured cerium oxide having a lattice structure that includes cerium atoms in mixed valence states of $Ce^{3+}$ and $Ce^{4+}$; and decorating the cerium oxide with small particles near a surface of the lattice structure such that a surface region of the cerium oxide lattice structure has a higher concentration of the small particles than an inner region of the cerium oxide lattice structure, the small particles having a diameter less than 1 nm. The cerium oxide is activated, in which after activation, the ratio of $Ce^{3+}/(Ce^{3+}+Ce^{4+})$ in the cerium oxide lattice structure ranges from 40% to 90% at 20° C., the valence states $Ce^{3+}$ and $Ce^{4+}$ being switchable in reduction and oxidation reactions, and the cerium oxide maintaining effective catalytic ability at temperatures at least up to 450° C.

Implementations of the method may include one or more of the following features. The small particles can include gold, tin, palladium, an alloy of gold and silver, an alloy of gold and copper, the oxides of the above, or a combination of the above. The small particles can include gold particles, and the concentration of the gold particles on the cerium oxide can range from 0.001 to 5.0 atomic percent compared to cerium. In some examples, the concentration of the gold particles on the cerium oxide can range from 0.005 to 0.02 atomic percent compared to cerium. The method can include mixing the cerium oxide with a solution containing gold in an oxidized state to facilitate an auto-reduction reaction that produces metallic gold particles that decorate the surface of the cerium oxide. The solution containing gold in an oxidized state can include a gold chloride solution. The small particles can include palladium or palladium oxide particles, and the concentration of the palladium or palladium oxide particles on the cerium oxide can range from 1 to 5 atomic percent compared to cerium. The small particles can include gold, silver, copper, zirconium, vanadium, platinum, palladium, iron, zinc, cobalt, silicon, nickel, manganese, rhodium, ruthenium, tungsten, rhenium, cadmium, iridium, molybdenum, phosphorus, tantalum, osmium, titanium, chromium, scandium, rare earths elements, the oxides of the above, or a combination of the above. The cerium oxide can include cerium oxide nanoscale structures. The cerium oxide nanoscale structures can include cerium oxide nanotubes, nanocubes, nanoparticles, nanorods, nanowires, nanostars, or complex nanoshapes. The method can include selecting a type of small particles from among a plurality of types of small particles to target a particular range of values for the ratio of $Ce^{3+}/(Ce^{3+}+Ce^{4+})$ in the cerium oxide lattice structure. For example, the cerium oxide can be decorated with tin particles to cause the ratio of $Ce^{3+}/(Ce^{3+}+Ce^{4+})$ in the cerium oxide lattice structure to be in a range from 40% to 50%. In some examples, the cerium oxide can be decorated with gold particles to cause the ratio of $Ce^{3+}/(Ce^{3+}+Ce^{4+})$ in the cerium oxide lattice structure to be in a range from 60% to 70%. In some examples, the cerium oxide can be decorated with gold particles to cause the ratio of $Ce^{3+}/(Ce^{3+}+Ce^{4+})$ in the cerium oxide lattice structure to be in a range from 70% to 90%.

DETAILED DESCRIPTION

Cerium oxide having a fluorite lattice structure having cerium atoms in mixed valence states of $Ce^{3+}$ and $Ce^{4+}$, in which the ratio of $Ce^{3+}/(Ce^{3+}+Ce^{4+})$ (referred to as the $Ce^{3+}$ fraction) in the lattice ranges from about 0.40 to 0.70 or 40% to 70% can be fabricated by intentionally introducing defects into the ceria lattice. In some implementations, the cerium oxide is activated in a low pressure oxygen containing environment to increase the defect sites in the ceria lattice. For example, the activation can be performed at a pressure of, e.g., 1 to 100 milli-Torr. In some implementations, the cerium oxide is decorated with nanoparticles, such as gold nanoparticles, to enhance the catalytic ability of the cerium oxide. In some examples, the concentration of gold can range from about 0.001 to 5.0 atomic percent compared to cerium.

In the description below, catalysis will be defined as an increase in the rate at which equilibrium of a reaction is achieved through the addition of a substance (i.e., the catalyst) that, once the reaction is at equilibrium, is indistinguishable from its original form.

The catalytic activity of cerium oxide may be attributed to the effect of defects in the ceria lattice structure. One type of lattice defects that may affect the reactivity of the cerium oxide surface is oxygen vacancy defects, in which an oxygen atom is missing in the lattice. The degree of oxygen mobility in the ceria lattice can be attributed to the size, dispersion, and quantity of the oxygen vacancy defects. It appears that the fraction of cerium in the 3+ oxidation state can be used as a parameter to compare the relative densities of oxygen vacancy defects in different ceria samples.

In some implementations, cerium oxide can be made in bulk form (which may have particles having dimensions in the micro meter scale), or as nanoparticles (having dimensions in the nanometer scale) or nanotubes (having tube structures with diameters in the nanometer scale). Fluorite structured cerium oxide nanotubes may have larger surface areas, compared to cerium oxide nanoparticles or cerium oxide in bulk form. The Fluorite structured cerium oxide nanotubes can be engineered to have a wide variety of defects with an emphasis on oxygen vacancy defects.

Figure 1:
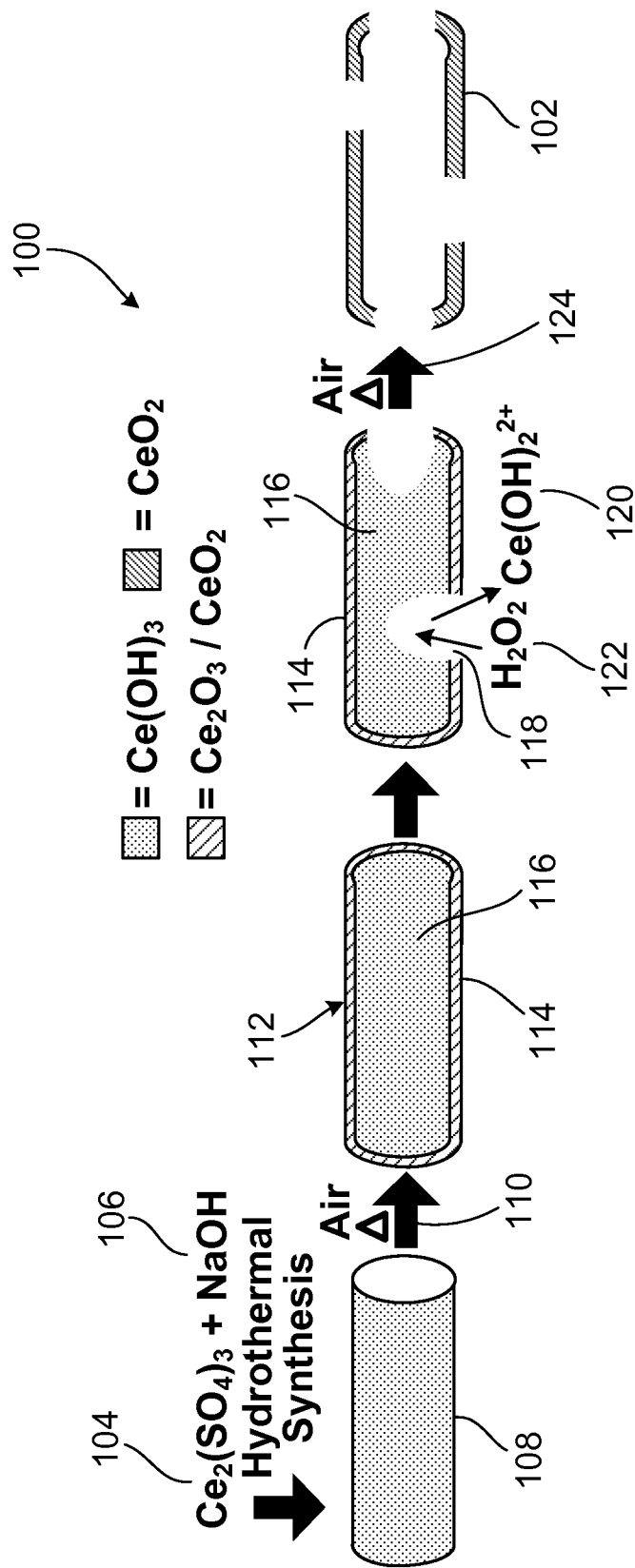
FIG. 1 is a diagram of a process for producing cerium oxide nanotubes by hydrothermal synthesis and Kirkendall diffusion.

Referring to FIG. 1, in some implementations, fluorite structured cerium oxide nanotubes 102 can be generated using a process 100 in which hydrothermal synthesis is used to generate nanowires, and Kirkendall diffusion mechanism is used to convert the nanowires to nanotubes. In Kirkendall diffusion, unequal diffusion rates in solids results in core-shell nanostructures and hollow nanostructures.

In the process 100, cerium(III) sulphate hydrate ($Ce_2(SO_4)_3 \cdot XH_2O$) 104 is dissolved in a sodium hydroxide solution (NaOH (aq)) 106 to form cerium (III) hydroxide ($Ce(OH)_3$) nanorods and nanowires 108 under hydrothermal conditions. The cerium (III) hydroxide ($Ce(OH)_3$) nanorods and nanowires 108 are subjected to rapid oxidation 110 at 50° C. in a convection oven. The rapid oxidation leads to the formation of a core-shell material 112 with cerium oxide ($CeO_{2-x}$) forming an outer shell 114 of the cubic fluorite structure and a core 116 made of remaining $Ce(OH)_3$ in a simple hexagonal structure. The rapid conversion between the two crystalline structures produces many defects on the surface of the core-shell material 112. This core-shell material 112 is sonicated in hydrogen peroxide ($H_2O_2$) 122, causing cracks 118 to be formed in the core-shell material and faster diffusion of the core material $Ce(OH)_3$ 120 away from the core 116 compared to diffusion of shell material $CeO_{2-x}$ away from the shell 114. The samples are heated in a convection oven 124, resulting in the formation of fluorite structured cerium oxide nanotubes 102.

The following describes an example in which fluorite structured cerium oxide nanotubes 102 were produced. Note that various parameter values, such as the quantities of the materials, temperatures of the processes, and time durations of the processes, are provided as examples only, other values can also be used.

A sample of 0.5 g cerium(III) sulphate hydrate ($Ce_2(SO_4)_3 \cdot XH_2O$, available from Sigma-Aldrich, St. Louis, Mo.) was dissolved into 40 mL of 10 M sodium hydroxide solution (NaOH (aq)). The solution was transferred to a 45 mL total volume Parr autoclave for hydrothermal treatment, and was allowed to react at 120° C. for 15 hours to produce cerium (III) hydroxide ($Ce(OH)_3$) nanorods and nanowires. The product was cooled and filtered using 3.0 μm membranes (available from Millipore, Billerica, Mass.) and rinsed with 3 aliquots of 50 mL water. All water used in this example was Ultrapure water of >18 MΩ resistivity filtered through 0.22 micron pore-sized filters.

After rinsing, the $Ce(OH)_3$ nanorods and nanowires were placed in a convection oven at 50° C. for 1 hour for partial oxidation to transform the P63/m $Ce(OH)_3$ into a cerium oxide containing both $P\bar{3}m1$ $Ce_2O_3$ and $Fm\bar{3}m$ (fluorite) $CeO_{2-x}$. The partially oxidized sample was gently powdered using a spatula and heated in a convection oven at 50° C. for an additional hour for continued partial oxidation. The sample was mixed with 50 mL water and 50 mL of ~15% hydrogen peroxide ($H_2O_2$), immediately followed by sonication for 30 minutes. The samples were left in the hydrogen peroxide solution for 60 minutes for their oxidative transformation into tubular structures. The resulting product was filtered using 0.8 μm Millipore membranes, rinsed with three 50-mL aliquots of water, and dried in a convection oven at 50° C. for 2 hours, resulting in the formation of fluorite structured cerium oxide nanotubes.

A 100 mg sample of cerium oxide nanotubes was activated by thermal heating in a 1-inch quartz tube furnace with a 100 standard cubic centimeter per minute (sccm) flow of a nitrogen-oxygen mixture (80% $N_2$ and 20% $O_2$) for 1 hour at 350° C. under vacuum with an operating pressure of 0.1 Torr. The cerium oxide nanotubes produced using the process described above can have a diameter of about 20 nm and a length ranging from a few tens of nanometers to a micron.

Pre and post $H_2O_2$ treated ceria was examined by X-ray diffraction (XRD) analysis using Bruker AXS D8 Discover with GADDS area, available from Bruker AXS Inc., Madison, Wis., for examining the crystallinity and crystal structure of the samples produced in different stages of the synthesis. The weighted average wavelength of the Cu Kα x-ray source used was 1.5417 Å. The XRD spectrum was indexed to JCPDS 00-34-0394 $Fm\bar{3}m$ $CeO_2$ and compared with JCPDS 00-023-1048 $P\bar{3}m1$ $Ce_2O_2$ and JCPDS 01-074-0665 $Ce(OH)_3$ P63/m.

The XRD analysis indicates that the ceria progressed from $Ce(OH)_3$ prior to oxidation with the $H_2O_2$ to a combination of $Ce_2O_3$ and $CeO_2$ (both fluorite structure) after treatment with $H_2O_2$, and finally to a match to just fluorite structured $CeO_2$ after the final calcination and activation step. The analysis showed the low pressure activated ceria nanotubes have pure $Fm\bar{3}m$ cubic structure.

The process described above for fabricating cerium oxide nanotubes can be easily scaled to produce large batches of cerium oxide nanotubes that are robust over long periods of time.

Figure 2:
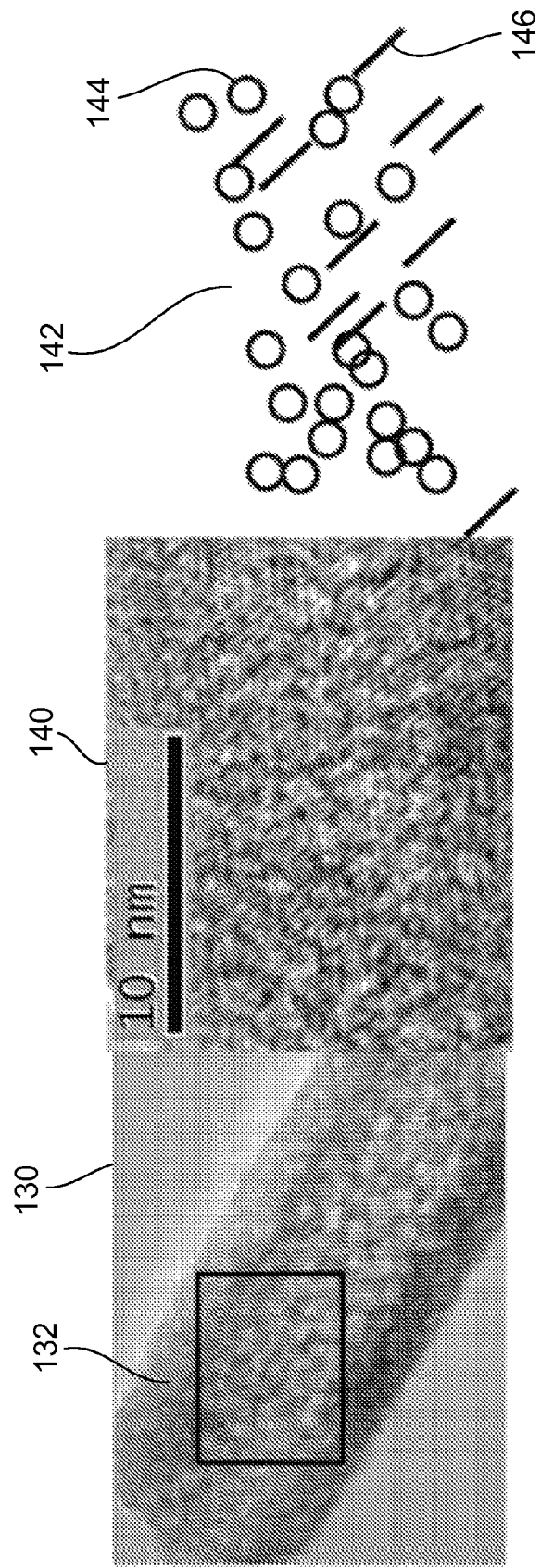
FIGS. 2A and 2B are transmission electron microscopy images of a cerium oxide nanotube.
FIG. 2C is a diagram indicating locations of defects in the cerium oxide nanotube.

FIG. 2A shows an image 130 of the detailed structures of (111) $CeO_2$ nanotube obtained by high resolution transmission electron microscopy (HRTEM) with a Tecnai G2 F20 S-Twin microscope (available from FEI, Hillsboro, Oreg.) operated at 200 keV. The sample was prepared by dropcasting a solution of the sample sonicated, for no more than 5 seconds, in methanol onto a holey carbon film on a copper grid support.

FIG. 2B shows an enlarged image 140 of a portion 132 of the image 130 of FIG. 2A. FIG. 2C is a diagram 142 showing the locations of oxygen vacancy defects (represented by the circles 144 and line segments 146) in the cerium oxide nanotube shown in the image 140 of FIG. 2B.

Oxygen vacancy defects that can be identifiable by HRTEM include oxygen vacancy defect sites with missing oxygen atoms, and the linear cluster defect composed of lines of missing oxygen atoms in the first atomic surface layer. The images 130 and 140 show that rapid oxidation of $Ce(OH)_3$ results in a surface with many defects, and that oxygen vacancies were formed during annealing under vacuum.

The HRTEM data indicates that the lattice face which was predominant was the (111) face, which is the thermodynamically more stable facet for fluorite structure cerium oxide. The HRTEM also indicated that the cerium oxide nanotubes have a wide variety of different types of defect sites. The defect sites that can be identified in the HRTEM images 130 and 140 include step edge, grain boundary, and line defect sites. Also identifiable are the three major types of vacancy cluster defects: surface vacancy, subsurface vacancy, and linear vacancy clusters that represent both mobile and stable defects. These defects and vacancy clusters are likely significant contributors to the increased catalytic activity of the cerium oxide nanotubes and are correlated to the ratio of $Ce^{3+}$ to $Ce^{4+}$.

While it appears that the grain boundary and step edge defects appear during the synthetic processing, changing from simple hexagonal lattice to that of a fluorite structure, the appearance of the vacancy clusters seems to be largely due to the post processing. The activation of the cerium oxide nanotubes at low pressure (e.g., <0.1 Torr) and high temperature (e.g., 400° C.) appears to have introduced many vacancy cluster defects into the cerium oxide nanotubes. While HRTEM is only truly sensitive to columns of atoms, it is possible to detect areas which correspond to VCs.

Figure 3:
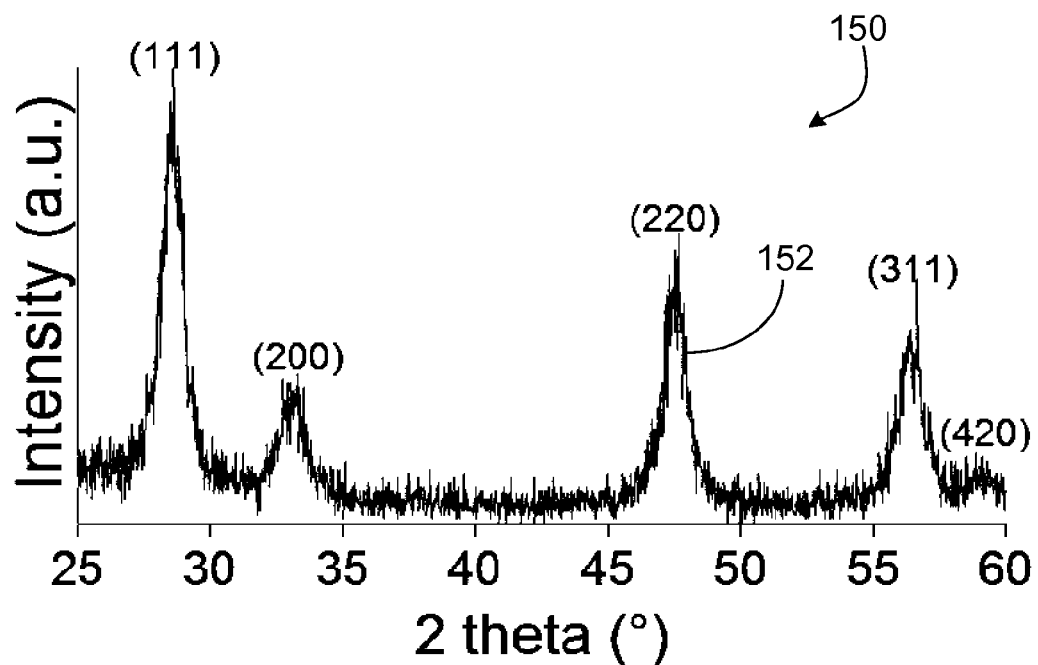
FIG. 3 is a graph showing an X-ray diffraction pattern of cerium oxide nanotubes.

FIG. 3 is a graph 150 showing X-ray diffraction pattern 152 of the cerium oxide. Each peak can be indexed to a pure phase face-centered cubic [space group: Fm3m (225)] of ceria (JCPDS no 34-0394). The widths of the peaks in the X-ray diffraction pattern 152 appear to be broadened, indicating the existence of nanostructures in the cerium oxide fluorite structure.

Figure 4:
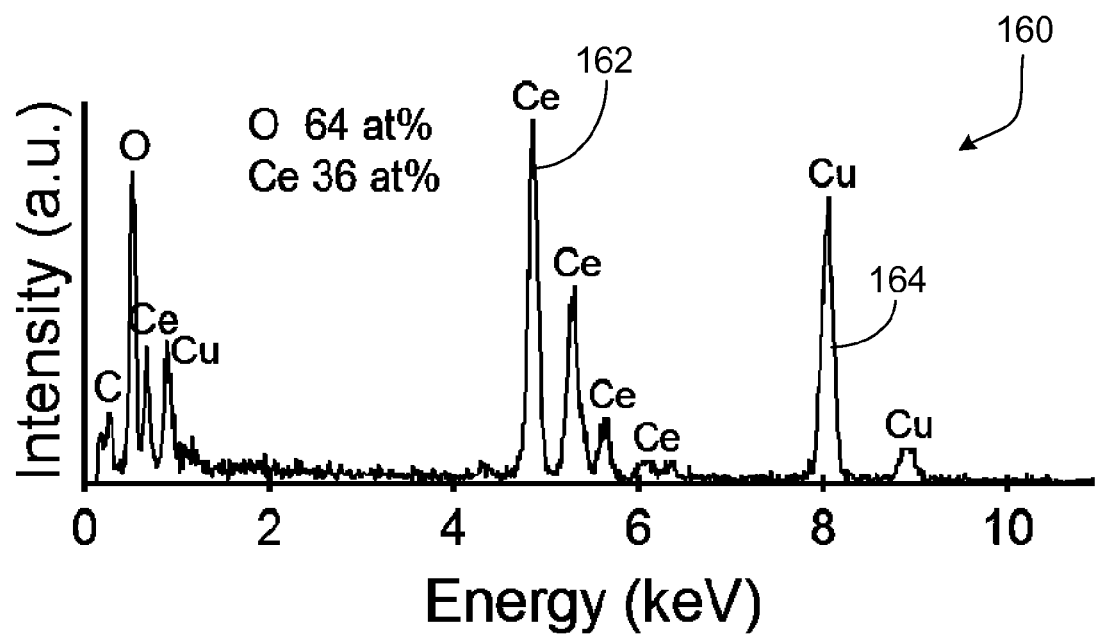
FIG. 4 is a graph showing an energy dispersive X-ray spectroscopy spectrum of the cerium oxide nanotubes.

FIG. 4 is a graph 160 showing an energy dispersive X-ray (EDX) spectrum 162 of the cerium oxide nanotubes after the low-pressure activation step. This can be used to examine the elemental composition of the ceria samples, for example, for calculating the cerium to oxygen ratio, in which copper, from the TEM grid, peaks 164 can be used as references.

The $Ce^{3+}$ fraction in each ceria sample with different activation treatments was estimated by X-ray photoelectron spectroscopy (XPS) by using PHI 5000 VersaProbe™ scanning XPS Microprobe). X-ray photoelectron spectroscopy is a direct measurement of the valency state (oxidation state or $Ce^{3+}$ to $Ce^{3+}+Ce^{4+}$ ratio). In this example, XPSpeak 4.1 for Win 95/98 was used to subtract a fitted baseline using the Shirley algorithm for each spectrum of the XPS data. Each fitted baseline was assumed to encompass the entire spectrum. No linearization was used in this fitting. The Shirley algorithm was used because it is the least incorrect baseline method optimized to remove asymmetry from the baseline data. Semi-Voigt functions (convolved Gaussian-Lorentzian line shapes) were then fitted to the resulting spectrum in order to determine the area of each of the ten peaks corresponding to the signals from $Ce^{3+}$ and $Ce^{4+}$ according to the formula:

$$\%Ce^{3+} = \left( \frac{[A_{v0} + A_{v'} + A_{u0} + A_{u'}]}{[A_{v0} + A_v + A_{v'} + A_{v''} + A_{v'''} + A_{u0} + A_u + A_{u'} + A_{u''} + A_{u'''}]} \right) * 100\%$$

The peaks were fitted in a series of iterations, which allowed the areas and the full width at half maximum to vary throughout all steps. The percentage of Gaussian contribution for each line shape was allowed to vary between 80% and 100% after the initial fit. The peak locations were allowed to vary up to 0.2 eV during the last iteration.

Figure 5:
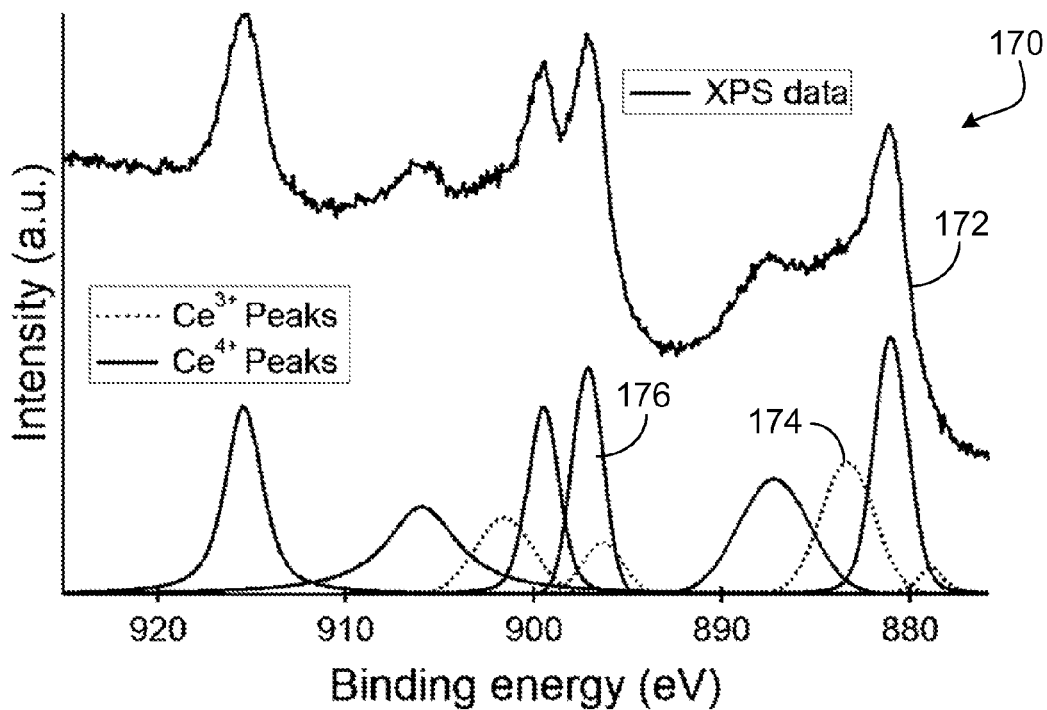
FIG. 5 is a graph showing an X-ray photoelectron spectroscopy spectrum of the cerium oxide nanotubes.

FIG. 5 is a graph 170 showing an example X-ray photoelectron spectroscopy spectrum of the cerium oxide nanotubes. XPS peak fitting showing the convolved Gaussian-Lorentzian line shapes corresponding to the $Ce^{3+}$ (lower dashed lines, e.g., 174) and $Ce^{4+}$ (lower solid lines, e.g., 176) fitted to the XPS raw data (upper line 172). By comparing the relative area of the $Ce^{3+}$ peaks to the total area, we can approximate changes in the valence of the cerium in the oxide samples. In this example, there is about 41% $Ce^{3+}$ and about 59% $Ce^{4+}$ in the cerium oxide nanotubes after activation. The change in $Ce^{3+}$ to $Ce^{4+}$ ratio after vacuum activation indicates a change in the number of oxygen vacancy clusters in the cerium oxide nanotubes.

After the cerium oxide nanotubes were activated, the cerium oxide was analysed using the bench mark carbon monoxide oxidation catalysis. The cerium oxide nanotube sample was placed into a reaction chamber, and a mixture of 78% helium, 20% oxygen and 2% carbon monoxide was flowed through the sample. The sample was warmed in 5 degree Celsius increments from room temperature to 250° C. 1 mL samples of gas were then analyzed by gas chromatography.

Figure 6:
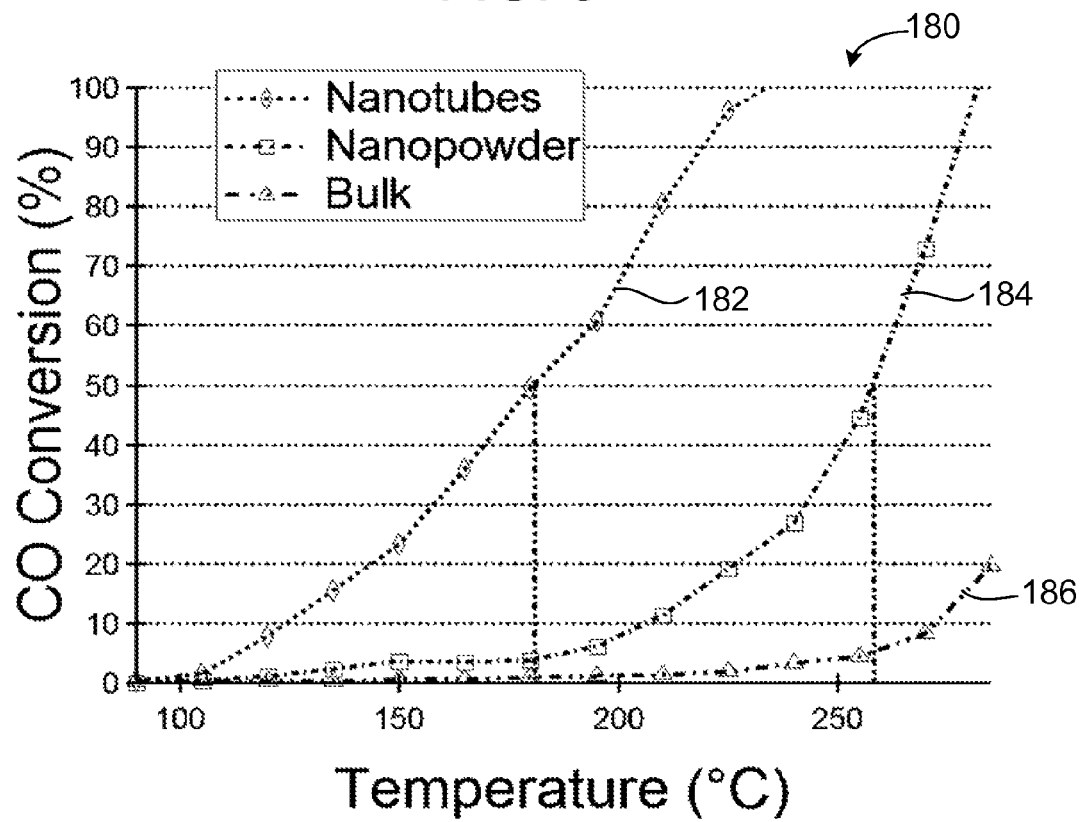
FIG. 6 is a graph showing the carbon monoxide conversion efficiency of different forms of cerium oxide at various temperatures.

FIG. 6 is a graph 180 showing the carbon monoxide conversion efficiency of the cerium oxide at various temperatures. Data curves 182, 184, and 186 represent the carbon monoxide conversion efficiency of cerium oxide nanotubes, cerium oxide nanopowder, and cerium oxide in bulk form, respectively. The curves 182, 184, and 186 indicate that the cerium oxide nanotubes have a higher conversion efficiency than cerium oxide nanopowder, which has a higher conversion efficiency than cerium oxide in bulk form. The curves also indicate that low pressure activated nanoceria has a lower $T_{50}$ than atmospheric pressure activated ceria.

The performance of the cerium oxide catalyst in converting carbon monoxide to carbon dioxide can be measured using two parameters: the turn over number (TON) and the light-off number ($T_{50}$). The turn over number is a measure of the number of micromoles of carbon monoxide per second per gram of catalyst ($\mu mol*g^{-1}*sec^{-1}$) reported at a given temperature that is oxidized to carbon dioxide. This is a measure of the increase in the kinetics of the reaction. The light-off number ($T_{50}$) is the temperature at which a given amount of catalyst can oxidize fifty percent of the carbon monoxide flowing through it. The light-off number is a measure of efficiency of a given catalyst.

For the cerium oxide nanotubes, the light-off temperature ($T_{50}$) of carbon monoxide oxidation was determined to be 175° C. and the turn-over number (TON) was calculated to be 2.21 $\mu mol*g^{-1}*sec^{-1}$ @ 250° C. These results indicate that the cerium oxide nanotubes that were activated under a lower pressure oxygen containing environment can produce a significant decrease in the energy of activation of the reaction, and a rapid rate of reaction greater than that of other commercially available cerium oxide materials.

Figure 7:
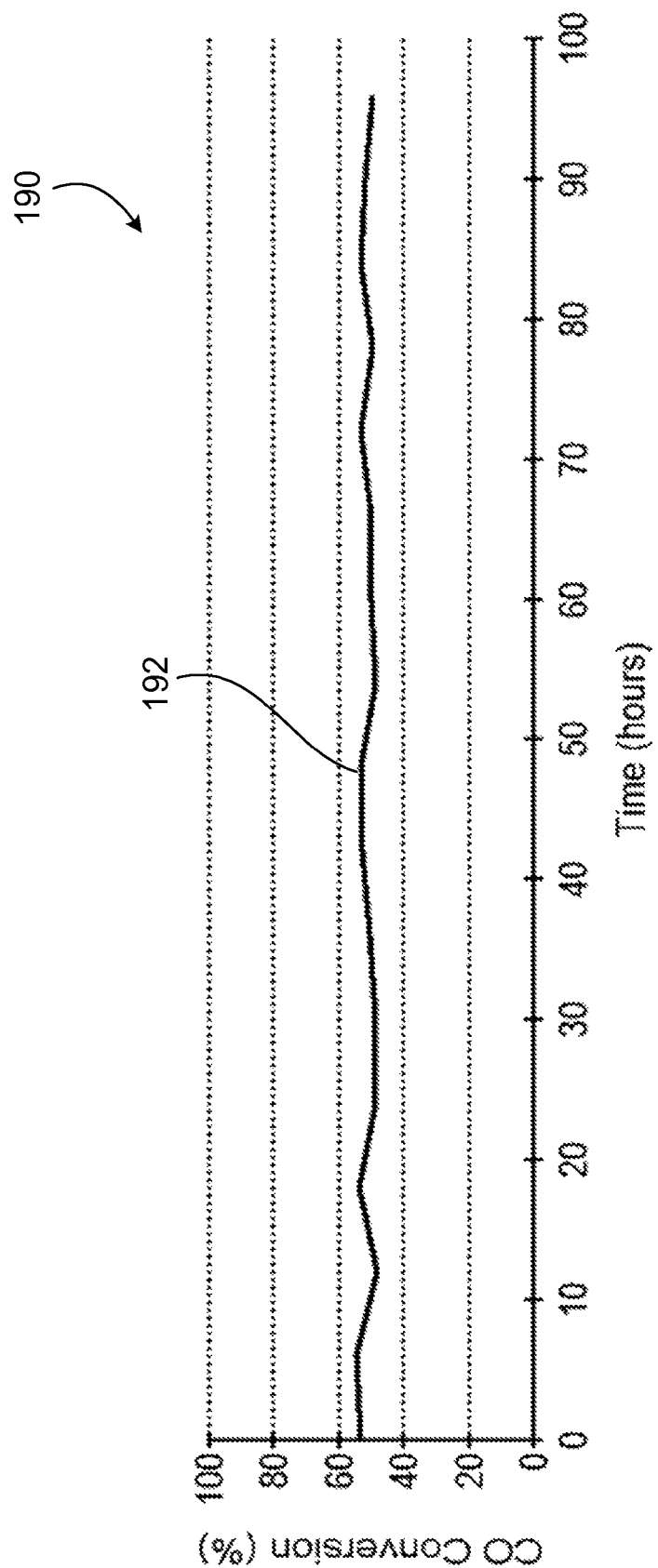
FIG. 7 is a graph showing the carbon monoxide conversion efficiency of the cerium oxide nanotubes over time.

FIG. 7 is a graph 190 showing a curve 192 representing the carbon monoxide conversion efficiency of the cerium oxide at 180° C. over a period of time. The curve 192 indicates that the cerium oxide nanotubes has a long term catalytic activity, and the conversion efficiency is maintained around 50% at 180° C. for at least 96 hours. The $T_{50}$ number of the cerium oxide nanotubes was stable, and the turn over number maintained at 2.5 $\mu mol*g^{-1}*sec^{-1}$ at 180° C., for at least one week.

The measurements performed above on the cerium oxide nanotubes indicate that defects are introduced into the nanotubes during synthesis by rapid oxidation and Kirkendall diffusion, and vacancy cluster defects are added to the nanotubes during activation under a high temperature, low pressure, oxygen containing environment. High resolution transmission electron microscopy is useful in identifying defects in the nanotubes. The defects enhance catalytic activity of the cerium oxide nanotubes, increase the reaction rate (as measured by the turn over number TON), and increased efficiency (as measured by the light-off number $T_{50}$).

While the graph 190 includes data up to about 96 hours, a long term testing has demonstrated that the cerium oxide nanotubes remain active over a period of at least 160 hours with almost no change in catalytic activity. This is an additional indicator that the cerium oxide nanotubes are acting as a catalyst rather than as a reactant. The XPS data from the post run cerium oxide nanotubes is not distinguishable from the XPS data from the pre-run cerium oxide nanotubes, indicating no change in the high ratio of $Ce^{3+}$ to $Ce^{4+}$.

Figure 8:
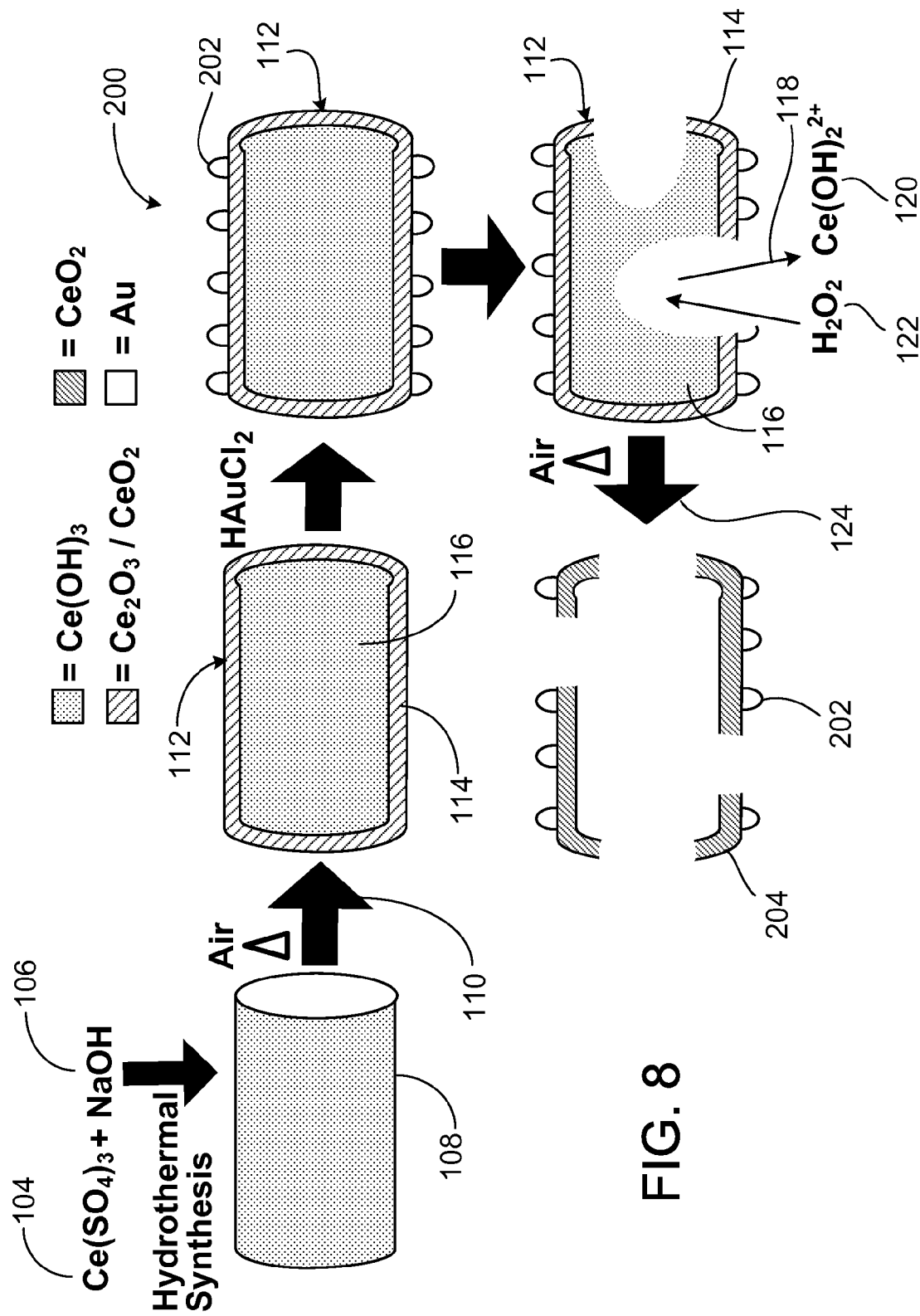
FIG. 8 is a diagram of a process for producing gold decorated cerium oxide nanotubes by hydrothermal synthesis, auto-reduction, and Kirkendall diffusion.

Referring to FIG. 8, in some implementations, fluorite structured cerium oxide nanotubes 102 that are decorated with gold particles can be generated using a process 200 in which hydrothermal synthesis is used to generate nanorods and/or nanowires, an auto-reduction process is used to produce metallic gold particles that decorate the surface of the cerium oxide nanorods and/or nanowires, and Kirkendall diffusion mechanism is used to convert the nanorods and/or nanowires to nanotubes.

Similar to the process 100, cerium (III) hydroxide (Ce(OH)$_3$) nanorods and nanowires 108 are formed using cerium(III) sulphate hydrate (Ce$_2$(SO$_4$)$_3$.XH$_2$O) 104 and a sodium hydroxide solution (NaOH (aq)) 106. The cerium (III) hydroxide (Ce(OH)$_3$) nanorods and nanowires 108 are subjected to rapid oxidation 110 at 50° C. in a convection oven, which results in the formation of a core-shell material 112 with cerium oxide (CeO$_{2-x}$) forming a hard outer shell 114 of the cubic fluorite structure and a core 116 made of remaining Ce(OH)$_3$ in a simple hexagonal structure.

The core-shell material 112 is mixed with an aqueous solution containing gold in an oxidized state, e.g., gold chloride (HAuCl$_4$), to facilitate an auto-reduction reaction. The core-shell material 112 has many Ce3+ ions that are oxidizable and react with gold chloride in which the gold in the gold chloride is reduced to gold metal, resulting in gold nanoparticles 202 being deposited on the surface of the core-shell material 112.

This core-shell material 112 is sonicated in hydrogen peroxide (H$_2$O$_2$) 122, causing cracks 118 to be formed in the core-shell material 112 and faster diffusion of the core material Ce(OH)$_3$ 120 away from the core 116 compared to diffusion of shell material CeO$_{2-x}$ away from the shell 114. The samples are heated in a convection oven 124, resulting in the formation of fluorite structured cerium oxide nanotubes 204 that are decorated with gold nanoparticles. In this example, the amount of gold decorating the surface of the core-shell material is about 0.01 atomic % compared to cerium.

The gold decorated cerium oxide nanotubes were activated by oxidizing the nanotubes with air, then reducing the nanotubes with hydrogen. This modifies (e.g., increases) the ratio of Ce$^{3+}$ to Ce$^{4+}$ and reduces Au$^{3+}$ to Au.

In the example above, the cerium oxide was decorated with gold particles. This is different from doping the cerium oxide with gold particles. There is a distinction between dopants and decorations. A dopant is an atom that is within the lattice of the host material, while a decoration is an atom, a molecule, or a cluster of atoms that has a separate and distinct lattice and is found at or near the surface of the primary structure.

Figure 9A:
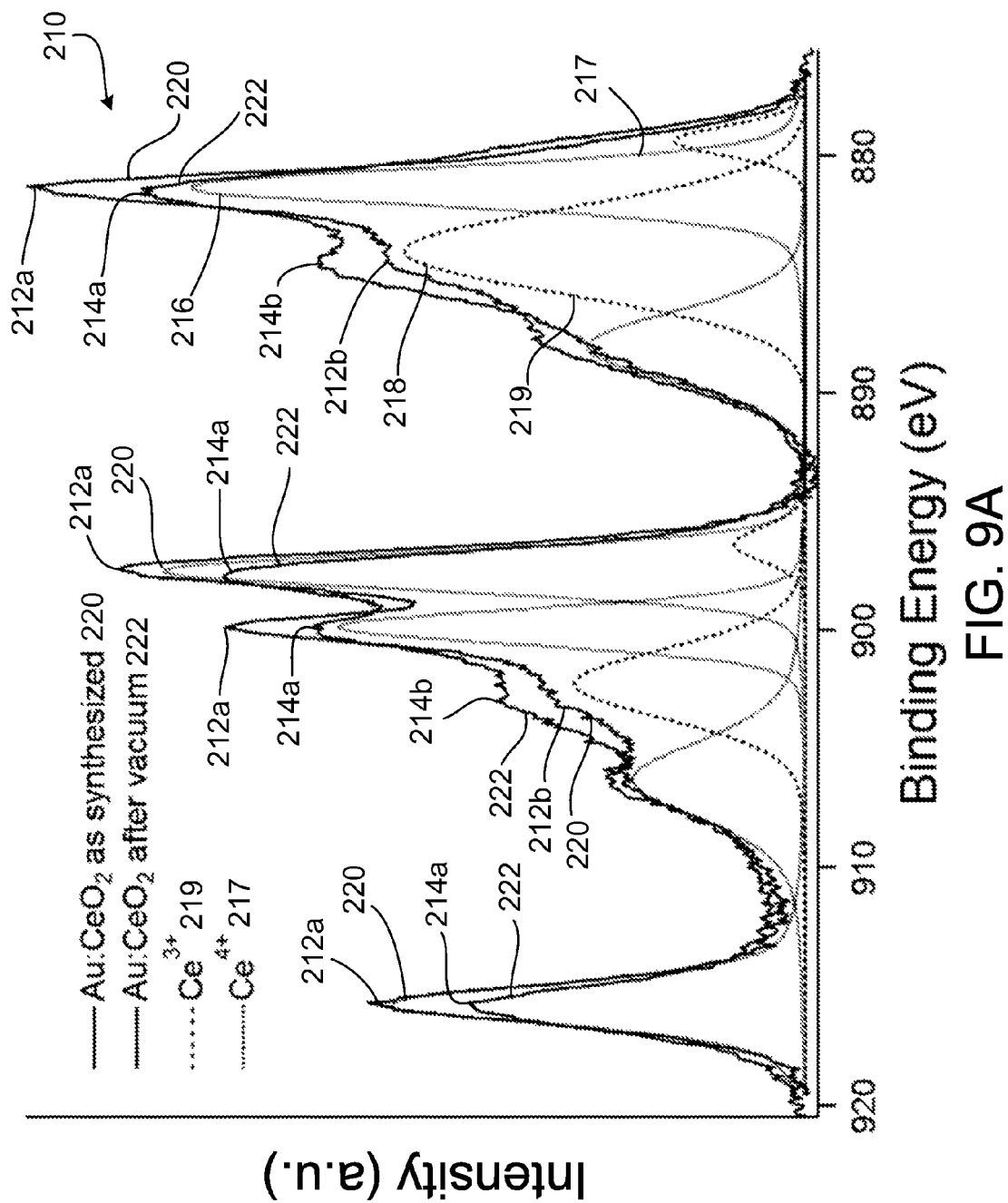
FIGS. 9A and 9B are graphs showing X-ray photoelectron spectroscopy spectrums of gold decorated cerium oxide nanotubes.
Figure 9B:
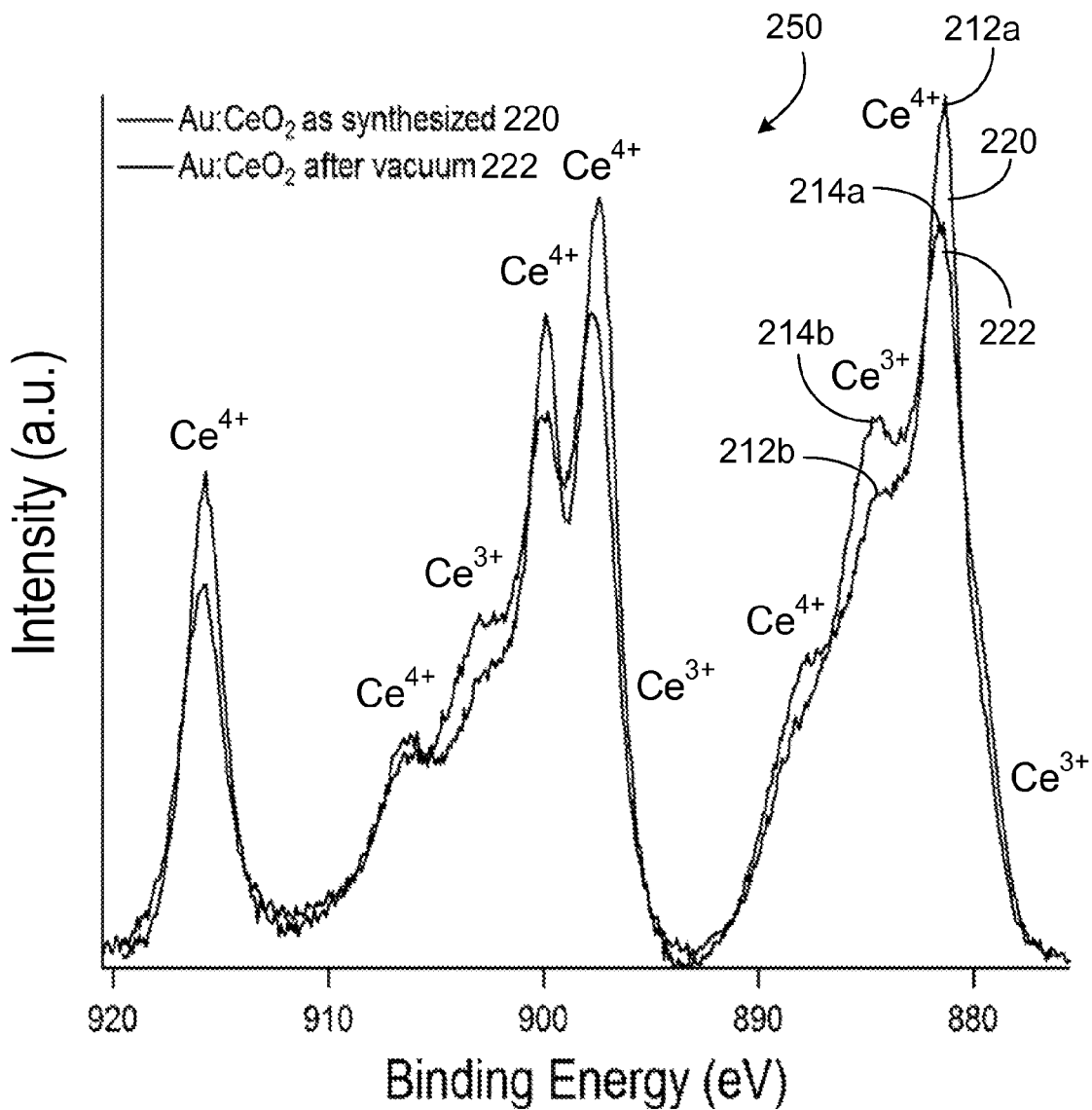

FIGS. 9A and 9B are graphs 210 and 250 showing X-ray photoelectron spectroscopy (XPS) spectrums 220 and 222 of the gold decorated cerium oxide nanotubes as synthesized and after activation in low pressure, respectively. In FIG. 9B, the peak fitting of the Ce$^{3+}$ and Ce$^{4+}$ spectra 219 and 217 have been removed. Labels "Ce$^{4+}$" and "Ce$^{3+}$" have been placed beside the local peaks in the XPS spectrums 220 and 222 to indicate whether the local peaks in the XPS spectrums 220 and 222 correspond to local peaks in the Ce$^{3+}$ spectrum 219 or Ce$^{4+}$ spectrum 217.

The XPS spectrum 220 has a total of 10 peaks. Four of the peaks in the spectrum correspond to cerium in the 3+ oxidation state while six of the peaks correspond to cerium in the 4+ oxidation state. The area of the four cerium 3+ peaks divided by the area of all ten peaks has been shown to produce a ratio of Ce$^{3+}$ to Ce$^{3+}$+Ce$^{4+}$. The XPS spectrum 220 has peaks 212a and 212b correspond to peaks in the Ce$^{4+}$ spectrum 217 and the Ce$^{3+}$ spectrum 219, respectively. The XPS spectrum 222 has peaks 214a and 214b that correspond to peaks in the Ce$^{4+}$ spectrum 217 and Ce$^{3+}$ spectrum 219, respectively.

Referring to FIG. 9B, a comparison of the relative heights of a local peak 212a and a local peak 212b, and the relative heights of a local peak 214a and a local peak 214b, indicates that the ratio of Ce$^{3+}$/Ce$^{4+}$ has increased after the gold decorated cerium oxide nanotube is activated in vacuum (compared to the gold decorated cerium oxide nanotube as synthesized).

Figure 10:
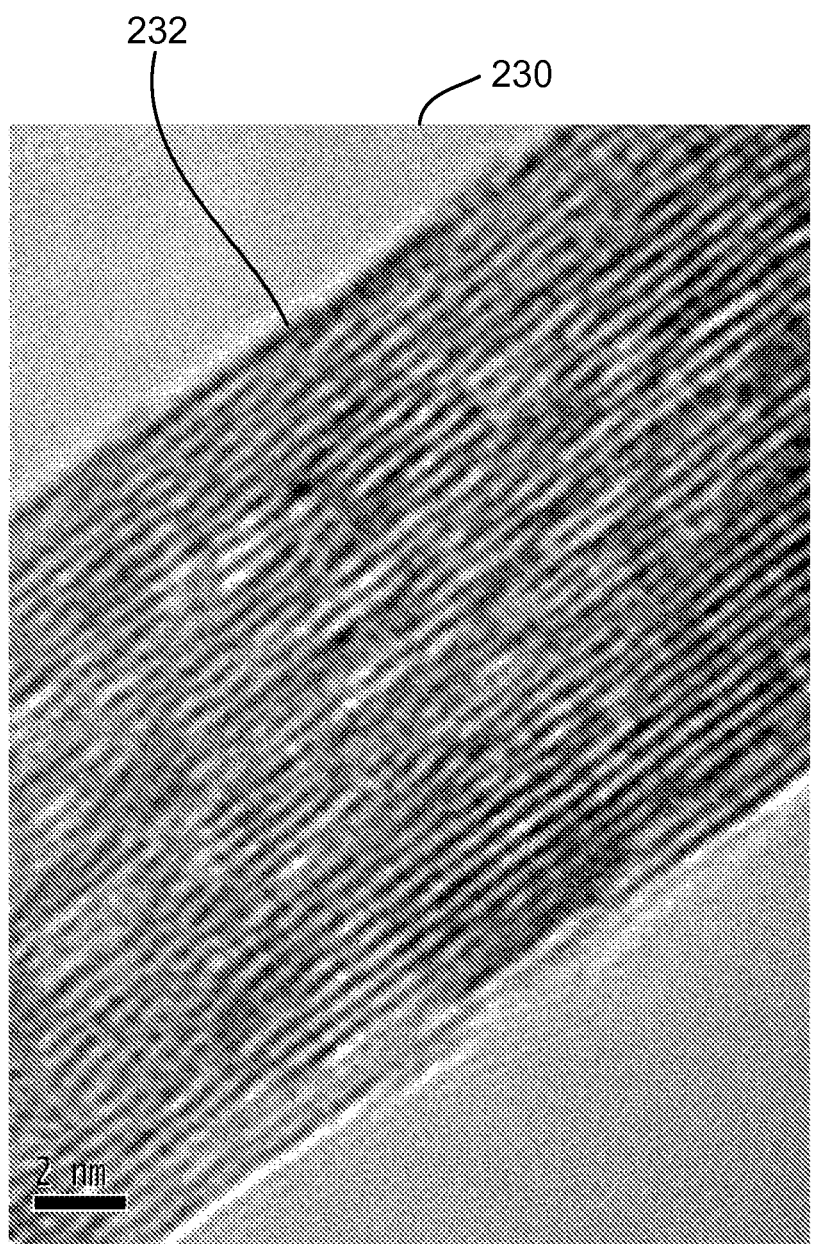
FIG. 10 is a transmission electron microscopy image of a gold decorated cerium oxide nanotube.

FIG. 10 is a high resolution transmission electron microscopy (HRTEM) image 230 of a gold decorated cerium oxide nanotube 232 showing oxygen vacancy defects.

Figure 11:
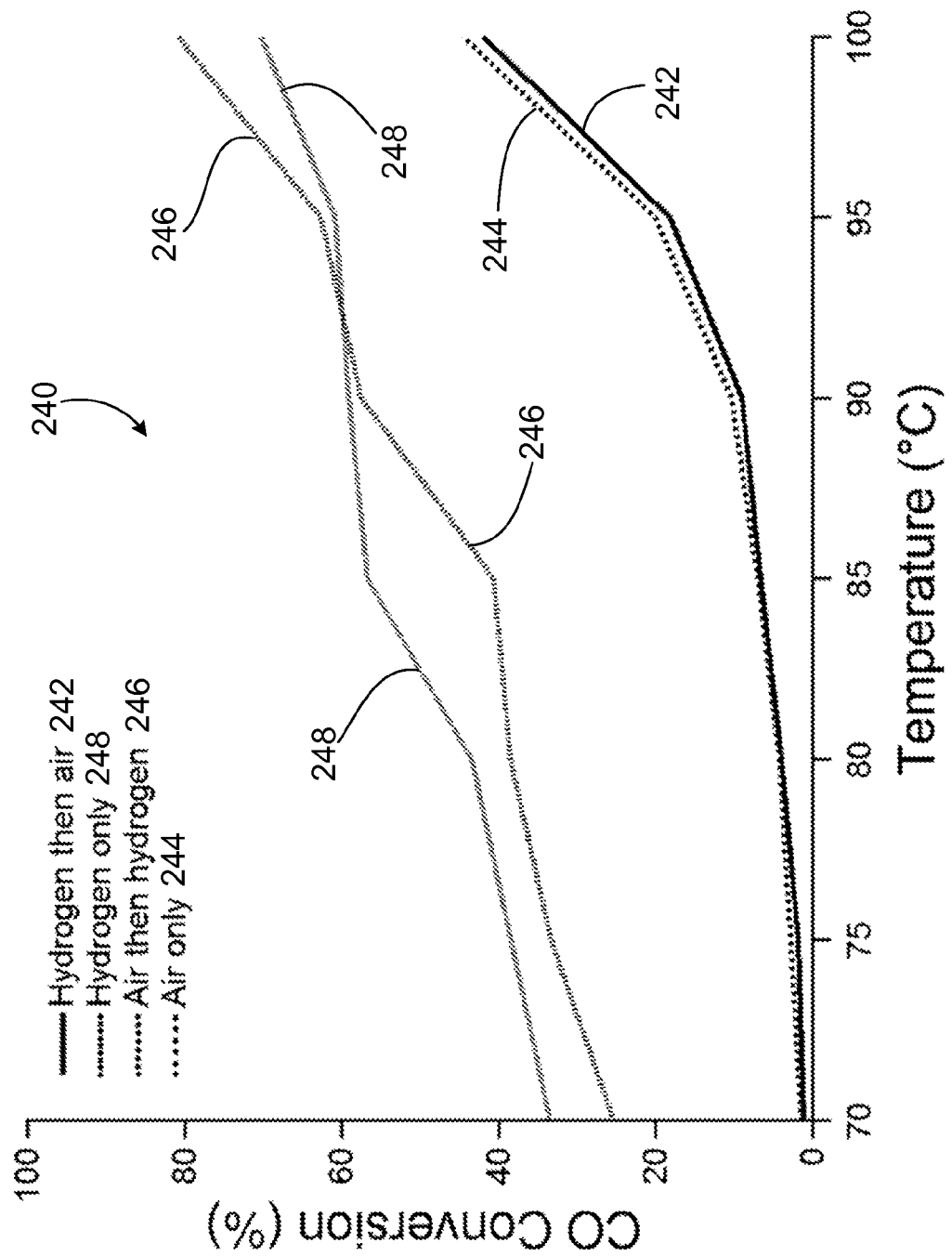
FIG. 11 is a graph showing comparison data of carbon monoxide conversion for different methods of activation of gold decorated cerium oxide nanotubes.

FIG. 11 is a graph 240 showing a comparison of carbon monoxide (CO) conversion for different methods of activation of gold decorated cerium oxide nanotubes. Curves 242, 244, 246, and 248 represents the CO conversion efficiency at various temperatures when the gold decorated cerium oxide nanotubes were activated by hydrogen then air, by air only, by air then hydrogen, and by hydrogen only, respectively. The curves 242 to 248 indicate that activation by hydrogen is better than activation by air.

Figure 12:
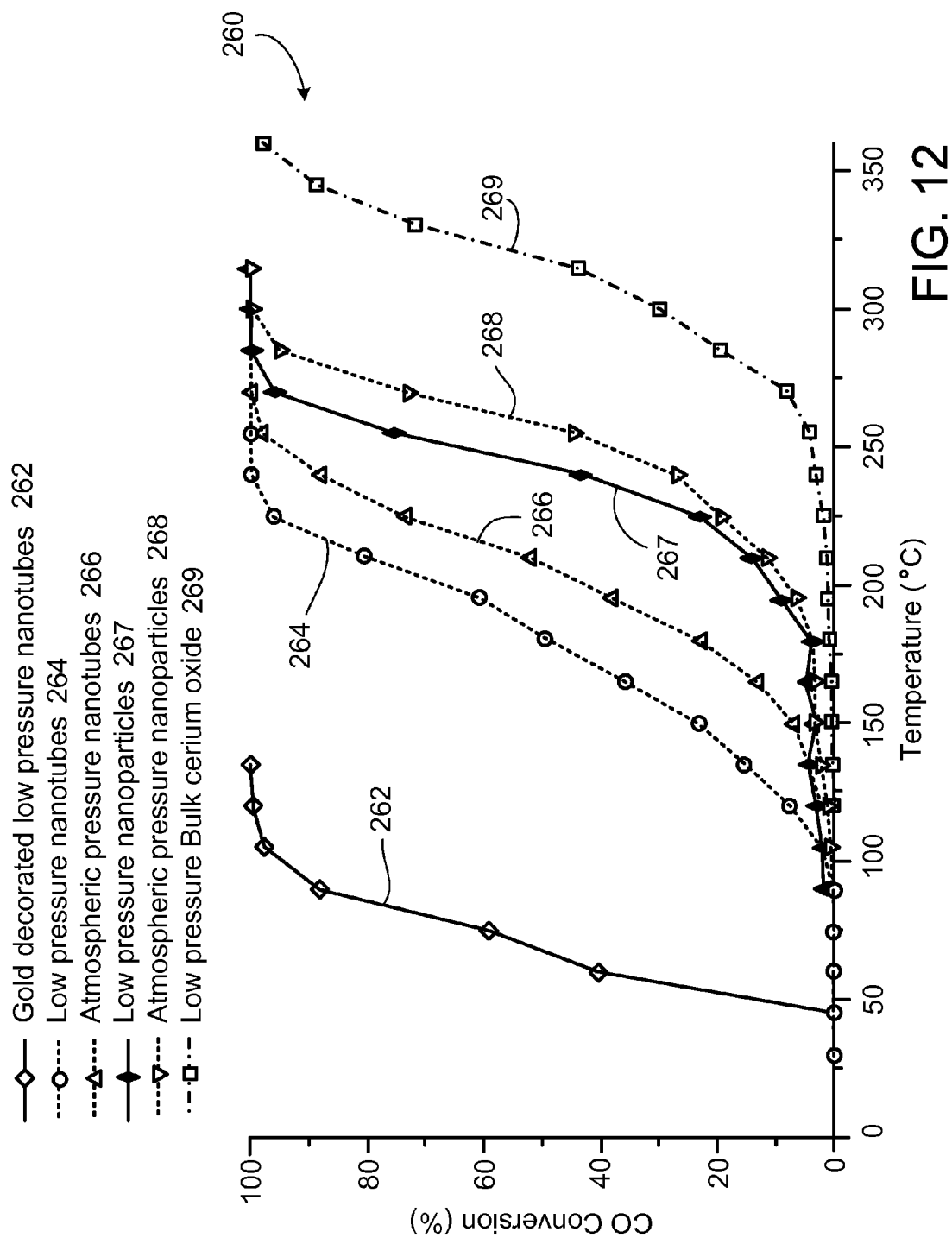
FIG. 12 is a graph showing the conversion of CO to $CO_2$ under different catalytic conditions.

FIG. 12 is a graph 260 showing the conversion of carbon monoxide (CO) to carbon dioxide (CO$_2$) under different catalytic conditions. The graph shows the effect of low pressure activation and the effect of gold decorations on the nanoparticles compared to the efficiency of bulk ceria. A curve 262 represents the CO conversion efficiency for gold decorated cerium oxide nanotubes that were activated under low pressure. A curve 264 represents the CO conversion efficiency for cerium oxide nanotubes that were activated under low pressure. A curve 266 represents the CO conversion efficiency for cerium oxide nanotubes that were activated under atmospheric pressure. A curve 267 represents the CO conversion efficiency for cerium oxide nanoparticles that were activated under low pressure. A curve 268 represents the CO conversion efficiency for cerium oxide nanoparticles that were activated under atmospheric pressure. A curve 269 represents the CO conversion efficiency for cerium oxide in bulk form that was activated under low pressure. The CO conversion efficiency of atmospheric pressure activated bulk ceria is almost the same as that activated under lower pressure, and thus is not shown separately.

Comparing curves 262 to 269 indicates that gold decorated cerium oxide nanotubes that are activated under low pressure have a much higher CO conversion efficiency compared to other types of cerium oxide. The light-off number (T$_{50}$) of gold decorated cerium oxide nanotube is about 58° C., which is much lower than the light-off number of cerium oxide nanotubes without gold decoration: about 175° C.

Figure 13:
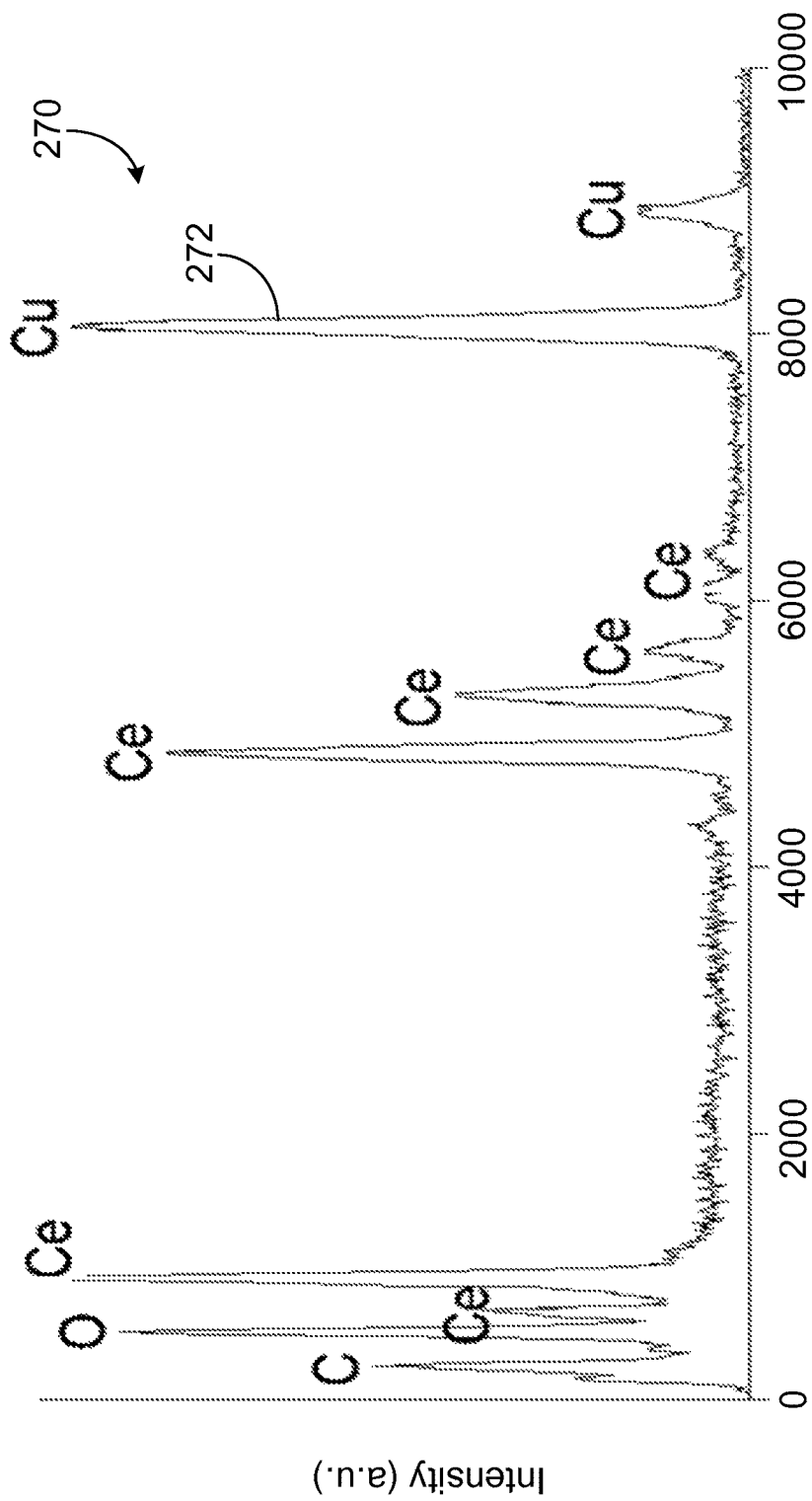
FIG. 13 is a graph showing an energy dispersive X-ray spectroscopy spectrum of the gold decoration cerium oxide nanotubes.

FIG. 13 is a graph showing an energy dispersive X-ray spectroscopy (EDX) spectrum 272 of the gold decoration cerium oxide nanotubes.

When the cerium oxide is used as a catalyst in different reactions, in some reactions it may be preferable to use cerium oxide having a higher percentage of Ce$^{3+}$ (e.g., 70%), while in other reactions it may be preferable to use cerium oxide having a lower percentage of Ce$^{3+}$ (e.g., 40%). By adjusting a combination of processing conditions when fabricating the cerium oxide, the percentage of Ce$^{3+}$ in the cerium oxide can be tuned to different values ranging from, e.g., 40% to 70%, that can be suitable for different applications. The conditions that can be adjusted include the pressure used in the low pressure activation, and the type of particles used to decorate the cerium oxide. If more than one type of particles are used to decorate the cerium oxide, the order in which the different types of particles are added to the cerium oxide during the decoration process may also affect the percentage of $Ce^{3+}$ in the final cerium oxide product.

The following describes examples for generating fluorite structured cerium oxide nanotubes having different levels of $Ce^{3+}$.

For example, fluorite structured cerium oxide having approximately 40 atomic percent $Ce^{3+}$ can be produced by activating the cerium oxide nanotubes at pressures at or below 0.1 Torr under flowing air.

Fluorite structured cerium oxide having approximately 50 atomic percent $Ce^{3+}$ can be produced by decorating the cerium oxide nanotubes with 2 atomic percent palladium, and activating the palladium decorated cerium oxide nanotubes at a pressure below 0.1 Torr in nitrogen.

Fluorite structured cerium oxide having approximately 60 atomic percent $Ce^{3+}$ can be produced by decorating the cerium oxide nanotubes with 1 atomic percent gold, and activating the gold decorated cerium oxide nanotubes at a pressure below 0.1 Torr in air.

Fluorite structured cerium oxide having approximately 70 atomic percent $Ce^{3+}$ can be produced by decorating the cerium oxide nanotubes with 0.01 atomic percent gold, and activating the gold decorated cerium oxide nanotubes at a pressure below 0.1 Torr in air.

Fluorite structured cerium oxide having greater than 70 atomic percent $Ce^{3+}$ can be produced by decorating the cerium oxide nanotubes with 0.01 atomic percent gold, and activating the gold decorated cerium oxide nanotubes at a pressure below 0.05 Torr in nitrogen.

Each of the examples above can be further fine-tuned to adjust the percentage of $Ce^{3+}$ (e.g., to achieve 45, 55, or 65 atomic percent Ce3+) designed to catalyze specific reactions.

Although some examples have been discussed above, other implementations and applications are also within the scope of the following claims. For example, measurement of the ratio of $Ce^{3+}$ to $Ce^{3+}+Ce^{4+}$ can be indirectly inferred using scanning tunneling microscopy (STM) and high resolution transmission electron microscopy (HRTEM), which can both observe the density and types of oxygen vacancy defects that are positively correlated to the $Ce^{3+}$ fraction. Extended x-ray absorption fine structure spectroscopy (EX-AFS) can be used as it provides a direct measurement of many parameters of the crystal structure and is highly unlikely to change the oxidation states of cerium. Raman scattering spectroscopy can be used to indirectly measure the presence of oxygen vacancy defects which correlate positively to the $Ce^{3+}$ fraction and can be used to quickly and inexpensively infer the presence of high density of $Ce^{3+}$ in a cerium oxide sample.

The values for the $Ce^{3+}$ fraction of the cerium oxide described above are stable at least below 100° C. under atmospheric pressure. When the surrounding temperature is above 450° C., the cerium oxide lattice may begin to anneal and the $Ce^{3+}$ fraction may change within a few percent of the original $Ce^{3+}$ fraction measured at room temperature, as long as there is a continuous supply of reactants.

In FIG. 8, in the auto-reduction process for depositing gold nanoparticles on the surface of the core-shell material 112, other solutions containing gold in an oxidized state can be used.

The cerium oxide described above has a fluorite structure, which has a crystal lattice similar to that of $CaF_2$, also known as Fm$\overline{3}$m alternately written as Fm3-m. The cerium oxide may also have other structures. The fluorite structured cerium oxide can be produced as, e.g., fluorite structured cerium oxide nanocubes, nanoparticles, nanorods, nanowires, nanostars, or complex nanoshapes.

The cerium oxide can be decorated with various types of small particles, such as nanoparticles made of gold, tin, palladium, an alloy of gold and silver, an alloy of gold and copper, the oxide of the above, or a combination of the above. In some examples, the cerium oxide can be decorated with gold, silver, copper, zirconium, vanadium, platinum, palladium, iron, zinc, cobalt, silicon, nickel, manganese, rhodium, ruthenium, tungsten, rhenium, cadmium, iridium, molybdenum, phosphorus, tantalum, osmium, titanium, chromium, scandium, sulfur, rare earths elements, the oxide of one or more of the above, or a combination of the above.

When decorating the cerium oxide with gold particles, the amount of gold particles on the cerium oxide can range from, e.g., 0.001 to 5.0 atomic percent compared to cerium. In some examples, the concentration of the gold particles can range from 0.005 to 0.02 atomic percent compared to cerium content. When decorating the cerium oxide with palladium particles or palladium oxide particles, the concentration of the palladium particles or palladium oxide particles on the fluorite structured cerium oxide can range from 0.01 to 5 atomic percent compared to cerium.

What is claimed is:

1. A catalyst comprising:
cerium oxide nanotubes or nanorods having a fluorite lattice structure comprising cerium atoms in mixed valence states of $Ce^{3+}$ and $Ce^{4+}$, in which the ratio of $Ce^{3+}/(Ce^{3+}+Ce^{4+})$ in the lattice is configured to be approximately equal to a pre-selected value in a range from 40% to 70% at 20° C., the valence states $Ce^{3+}$ and $Ce^{4+}$ being reversible in reduction and oxidation reactions, the cerium oxide nanotubes or nanorods maintaining catalytic ability at temperatures at least up to 450° C.,
wherein the ratio of $Ce^{3+}/(Ce^{3+}+Ce^{4+})$ in the lattice is determined at least in part by activating the cerium oxide nanotubes or nanorods in an environment containing oxygen at a pressure at or below 10 Torr and at a temperature not more than 400° C.

2. The catalyst of claim 1, comprising small particles decorated near the surface of the fluorite structured cerium oxide lattice, in which the surface region of the cerium oxide lattice structure has a higher concentration of the small particles than an inner region of the cerium oxide lattice structure, the small particles having a diameter equal to or less than 1 nm.

3. The catalyst of claim 2 in which the small particles comprise at least one of gold, tin, palladium, an alloy of gold and silver, an alloy of gold and copper, the oxide of the above, or a combination of the above.

4. The catalyst of claim 3 in which the small particles comprise gold particles, and the concentration of the gold particles on the cerium oxide nanotubes or nanorods ranges from 0.001 to 5.0 atomic percent compared to cerium.

5. The catalyst of claim 4 in which the concentration of the gold particles ranges from 0.005 to 0.02 atomic percent compared to cerium.

6. The catalyst of claim 3 in which the small particles comprise at least one of palladium particles or palladium oxide particles, and the concentration of the palladium particles or palladium oxide particles on the fluorite structured cerium oxide nanotubes or nanorods ranges from 0.1 to 5 atomic percent compared to cerium.

7. The catalyst of claim 2 in which the small particles comprise at least one of gold, silver, copper, zirconium, vanadium, platinum, palladium, iron, zinc, cobalt, silicon, nickel, manganese, rhodium, ruthenium, tungsten, rhenium, cadmium, iridium, molybdenum, phosphorus, tantalum, osmium, titanium, chromium, scandium, sulfur, rare earths elements, the oxide of at least one of the above, or a combination of the above.

8. The catalyst of claim 2 in which the concentration of the small particles on the fluorite structured cerium oxide nanotubes or nanorods ranges from 0.001 to 5.0 atomic percent compared to cerium.

9. The catalyst of claim 1 in which the ratio of $Ce^{3+}/(Ce^{3+}+Ce^{4+})$ in the lattice structure ranges from 40% to 50% at 20° C.

10. The catalyst of claim 1 in which the ratio of $Ce^{3+}/(Ce^{3+}+Ce^{4+})$ in the lattice structure ranges from 50% to 60% at 20° C.

11. The catalyst of claim 1 in which the ratio of $Ce^{3+}/(Ce^{3+}+Ce^{4+})$ in the lattice structure ranges from 60% to 70% at 20° C.

12. The catalyst of claim 1 in which the ratio of $Ce^{3+}/(Ce^{3+}+Ce^{4+})$ in the lattice structure ranges from 70% to 90% at 20° C.

13. The catalyst of claim 1 in which the fluorite lattice structure comprises nanotubes, and the ratio of $Ce^{3+}/(Ce^{3+}+Ce^{4+})$ in the nanotubes is configured to be approximately equal to the pre-selected value in the range from 40% to 70% at 20° C.

14. The catalyst of claim 1 in which the fluorite lattice structure comprises nanorods, and the ratio of $Ce^{3+}/(Ce^{3+}+Ce^{4+})$ in the nanorods is configured to be approximately equal to the pre-selected value in the range from 40% to 70% at 20° C.

15. The catalyst of claim 1, in which each of at least some of the cerium oxide nanotubes or nanorods comprises a shell, and an outer surface region of the shell of the cerium oxide nanotube or nanorod has a higher concentration of the small particles than a region inside the shell of the cerium oxide nanotube or nanorod, the small particles having a diameter equal to or less than 1 nm.

16. A method of fabricating a catalyst, the method comprising:
producing fluorite structured cerium oxide nanotubes or nanorods having a lattice structure comprising cerium atoms in mixed valence states of $Ce^{3+}$ and $Ce^{4+}$; and
activating the cerium oxide nanotubes or nanorods in a low pressure environment having oxygen and at a temperature not more than 400° C., the pressure being in a range from $1\times10^{-10}$ to 10 Torr such that after activation, the ratio of $Ce^{3+}/(Ce^{3+}+Ce^{4+})$ in the cerium oxide lattice structure ranges from 40% to 70% at 20° C., the valence states $Ce^{3+}$ and $Ce^{4+}$ being reversible in reduction and oxidation reactions, the cerium oxide nanotubes or nanorods maintaining effective catalytic ability at temperatures at least up to 450° C., and
selecting a pressure for the environment for activating the cerium oxide nanotubes or nanorods to target a particular range of values for the ratio of $Ce^{3+}/(Ce^{3+}+Ce^{4+})$ in the cerium oxide lattice structure.

17. The method of claim 16 in which activating the cerium oxide nanotubes or nanorods comprises flowing a mixture of $O_2$ and an inert gas over the surface of the cerium oxide nanotubes or nanorods at a temperature between 300 to 400° C. at a pressure not more than 0.1 Torr.

18. The method of claim 16, comprising controlling the pressure in the environment during activation to control the ratio of $Ce^{3+}/(Ce^{3+}+Ce^{4+})$ in the cerium oxide lattice structure.

19. The method of claim 18, comprising applying a lower pressure in the environment during activation to achieve a higher ratio of $Ce^{3+}/(Ce^{3+}+Ce^{4+})$ in the cerium oxide lattice structure, as compared to the ratio of $Ce^{3+}/(Ce^{3+}+Ce^{4+})$ in the cerium oxide nanotubes or nanorods that is produced by applying a higher pressure in the environment during activation.

20. The method of claim 16 in which the fluorite structured cerium oxide comprises nanotubes, and after activation of the cerium oxide, the ratio of $Ce^{3+}/(Ce^{3+}+Ce^{4+})$ in the nanotubes ranges from 40% to 70% at 20° C.

21. The method of claim 16 in which the fluorite structured cerium oxide comprises nanorods, and after activation of the cerium oxide, the ratio of $Ce^{3+}/(Ce^{3+}+Ce^{4+})$ in the nanorods ranges from 40% to 70% at 20° C.

22. The method of claim 16, in which producing fluorite structured cerium oxide nanotubes or nanorods comprises producing fluorite structured cerium oxide nanotubes or nanorods in which each of at least some of the cerium oxide nanotubes or nanorods comprises a shell, and
the method comprises decorating the cerium oxide nanotubes or nanorods with small particles near an outer surface of the shell of the nanotubes or nanorods such that an outer surface region of the shell of the cerium oxide nanotube or nanorod has a higher concentration of the small particles than a region inside the shell of the cerium oxide nanotube or nanorod, the small particles having a diameter equal to or less than 1 nm.

23. A method of fabricating a catalyst, the method comprising:
fabricating fluorite structured cerium oxide nanotubes or nanorods having a lattice structure comprising cerium atoms in mixed valence states of $Ce^{3+}$ and $Ce^{4+}$;
decorating the cerium oxide nanotubes or nanorods with small particles near a surface of the lattice structure such that a surface region of the cerium oxide lattice structure has a higher concentration of the small particles than an inner region of the cerium oxide lattice structure, the small particles having a diameter less than 1 nm; and
activating the cerium oxide nanotubes or nanorods in an environment containing oxygen at a pressure at or below 10 Torr and at a temperature not more than 400° C., in which after activation, the ratio of $Ce^{3+}/(Ce^{3+}+Ce^{4+})$ in the cerium oxide lattice structure ranges from 40% to 70% at 20° C., the valence states $Ce^{3+}$ and $Ce^{4+}$ being switchable in reduction and oxidation reactions, the cerium oxide nanotubes or nanorods maintaining effective catalytic ability at temperatures at least up to 450° C., and
selecting a pressure for the environment for activating the cerium oxide nanotubes or nanorods to target a particular range of values for the ratio of $Ce^{3+}/(Ce^{3+}+Ce^{4+})$ in the cerium oxide lattice structure.

24. The method of claim 23 in which decorating the cerium oxide nanotubes or nanorods with small particles comprises decorating the cerium oxide nanotubes or nanorods with at least one of gold, tin, palladium, an alloy of gold and silver, an alloy of gold and copper, the oxides of the above, or a combination of the above.

25. The method of claim 23 in which decorating the cerium oxide nanotubes or nanorods with small particles comprises decorating the cerium oxide nanotubes or nanorods with gold particles, the concentration of the gold particles on the cerium oxide nanotubes or nanorods ranging from 0.001 to 5.0 atomic percent compared to cerium.

26. The method of claim 25 in which decorating the cerium oxide nanotubes or nanorods with gold particles comprises decorating the cerium oxide nanotubes or nanorods with gold particles in an amount such that the concentration of the gold particles on the cerium oxide nanotubes or nanorods ranges from 0.005 to 0.02 atomic percent compared to cerium.

27. The method of claim 23, comprising mixing the cerium oxide nanotubes or nanorods with a solution containing gold in an oxidized state to facilitate an auto-reduction reaction that produces metallic gold particles that decorate the surface of the cerium oxide nanotubes or nanorods.

28. The method of claim 27 in which mixing the cerium oxide nanotubes or nanorods with a solution containing gold in an oxidized state comprises mixing the cerium oxide nanotubes or nanorods with a gold chloride solution.

29. The method of claim 23 in which decorating the cerium oxide nanotubes or nanorods with small particles comprises decorating the cerium oxide nanotubes or nanorods with at least one of palladium or palladium oxide particles, the concentration of the palladium or palladium oxide particles on the cerium oxide nanotubes or nanorods ranging from 1 to 5 atomic percent compared to cerium.

30. The method of claim 23 in which decorating the cerium oxide nanotubes or nanorods with small particles comprising decorating the cerium oxide nanotubes or nanorods with at least one of gold, silver, copper, zirconium, vanadium, platinum, palladium, iron, zinc, cobalt, silicon, nickel, manganese, rhodium, ruthenium, tungsten, rhenium, cadmium, iridium, molybdenum, phosphorus, tantalum, osmium, titanium, chromium, scandium, rare earths elements, the oxides of the above, or a combination of the above.

31. The method of claim 23, comprising selecting a type of small particles from among a plurality of types of small particles to target a particular range of values for the ratio of $Ce^{3+}/(Ce^{3+}+Ce^{4+})$ in the cerium oxide lattice structure.

32. The method of claim 23 in which decorating the cerium oxide nanotubes or nanorods with small particles comprises decorating the cerium oxide nanotubes or nanorods with tin particles to cause the ratio of $Ce^{3+}/(Ce^{3+}+Ce^{4+})$ in the cerium oxide lattice structure to be in a range from 40% to 50%.

33. The method of claim 23 in which decorating the cerium oxide nanotubes or nanorods with small particles comprises decorating the cerium oxide nanotubes or nanorods with gold particles to cause the ratio of $Ce^{3+}/(Ce^{3+}+Ce^{4+})$ in the cerium oxide lattice structure to be in a range from 60% to 70%.

34. The method of claim 23 in which decorating the cerium oxide nanotubes or nanorods with small particles comprises decorating the cerium oxide nanotubes or nanorods with gold particles to cause the ratio of $Ce^{3+}/(Ce^{3+}+Ce^{4+})$ in the cerium oxide lattice structure to be in a range from 70% to 90%.

35. The method of claim 23 in which the fluorite structured cerium oxide comprises nanotubes, and after activation of the cerium oxide, the ratio of $Ce^{3+}/(Ce^{3+}+Ce^{4+})$ in the nanotubes ranges from 40% to 70% at 20° C.

36. The method of claim 23 in which the fluorite structured cerium oxide comprises nanorods, and after activation of the cerium oxide, the ratio of $Ce^{3+}/(Ce^{3+}+Ce^{4+})$ in the nanorods ranges from 40% to 70% at 20° C.

37. The method of claim 23, in which fabricating fluorite structured cerium oxide nanotubes or nanorods comprises fabricating fluorite structured cerium oxide nanotubes or nanorods in which each of at least some of the cerium oxide nanotubes or nanorods comprises a shell, and decorating the cerium oxide nanotubes or nanorods with small particles comprises decorating the cerium oxide nanotubes or nanorods with small particles near an outer surface of the shell of the nanotubes or nanorods such that an outer surface region of the shell of the cerium oxide nanotube or nanorod has a higher concentration of the small particles than a region inside the shell of the cerium oxide nanotube or nanorod.

\* \* \* \* \*